United States Patent
Barthod et al.

(10) Patent No.: US 7,258,144 B2
(45) Date of Patent: Aug. 21, 2007

(54) DEVICE FOR HOMOGENEOUS DISTRIBUTION OF A FLUID IN A CHAMBER AND USES THEREOF

(75) Inventors: Daniel Barthod, Honfleur (FR); Denis Vedrine, Le Havre (FR); Pedro Nascimento, Le Havre (FR)

(73) Assignee: Total Fina Elf France, Puteaux (FR)

( * ) Notice: Subject to any disclaimer, the term of this patent is extended or adjusted under 35 U.S.C. 154(b) by 390 days.

(21) Appl. No.: 10/476,535

(22) PCT Filed: Apr. 19, 2002

(86) PCT No.: PCT/FR02/01348

§ 371 (c)(1),
(2), (4) Date: Sep. 13, 2004

(87) PCT Pub. No.: WO02/089969

PCT Pub. Date: Nov. 14, 2002

(65) Prior Publication Data

US 2005/0011972 A1 Jan. 20, 2005

(30) Foreign Application Priority Data

May 4, 2001 (FR) .................................. 01 05981

(51) Int. Cl.
*B65B 1/04* (2006.01)

(52) U.S. Cl. ...................... 141/286; 141/285; 220/86.3

(58) Field of Classification Search ................ 141/250, 141/255, 285, 286; 220/86.3
See application file for complete search history.

(56) References Cited

U.S. PATENT DOCUMENTS

| | | | | |
|---|---|---|---|---|
| 1,155,070 A * | 9/1915 | Kessler | ...................... | 220/86.2 |
| 1,725,537 A * | 8/1929 | Parson | ...................... | 220/86.3 |
| 1,995,007 A * | 3/1935 | Myers | ...................... | 220/86.3 |
| 2,145,759 A * | 1/1939 | Fellows et al. | ............ | 220/86.3 |
| 3,547,354 A | 12/1970 | Greathouse et al. | | |
| 4,471,821 A | 9/1984 | Coulon et al. | | |
| 7,040,360 B2 * | 5/2006 | Watson | ...................... | 141/255 |

FOREIGN PATENT DOCUMENTS

FR          2 280 436 A      2/1976

* cited by examiner

*Primary Examiner*—Timothy L. Maust
(74) *Attorney, Agent, or Firm*—Sughrue Mion, PLLC

(57) ABSTRACT

The invention concerns a device wherein the diffusion chamber (6) comprises, between its upstream end and its downstream end, in the direction of the fluid flow, at least an insert (12) formed by an annular ring having an external diameter identical to the internal diameter of the chamber, said annular ring being arranged perpendicular to the axis of the supply conduit and projecting towards the inside part of the chamber from the side wall(s) thereof, to form a lateral obstacle to the fluid flow, the solid surface of the insert (12) being sufficient to generate in the upstream part of the chamber a pressure higher than that of the downstream part.

19 Claims, 2 Drawing Sheets

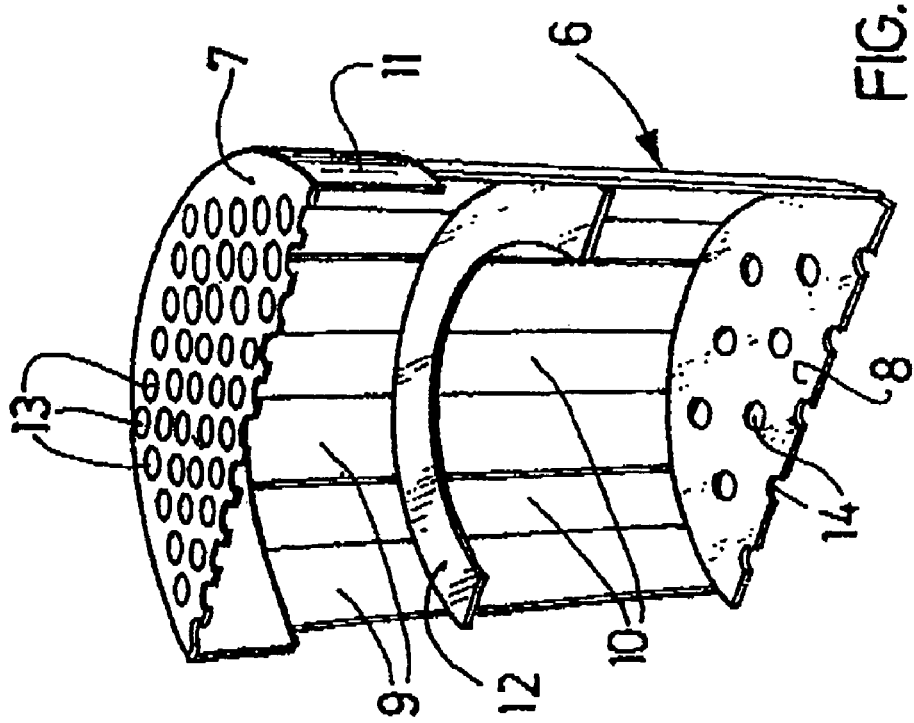
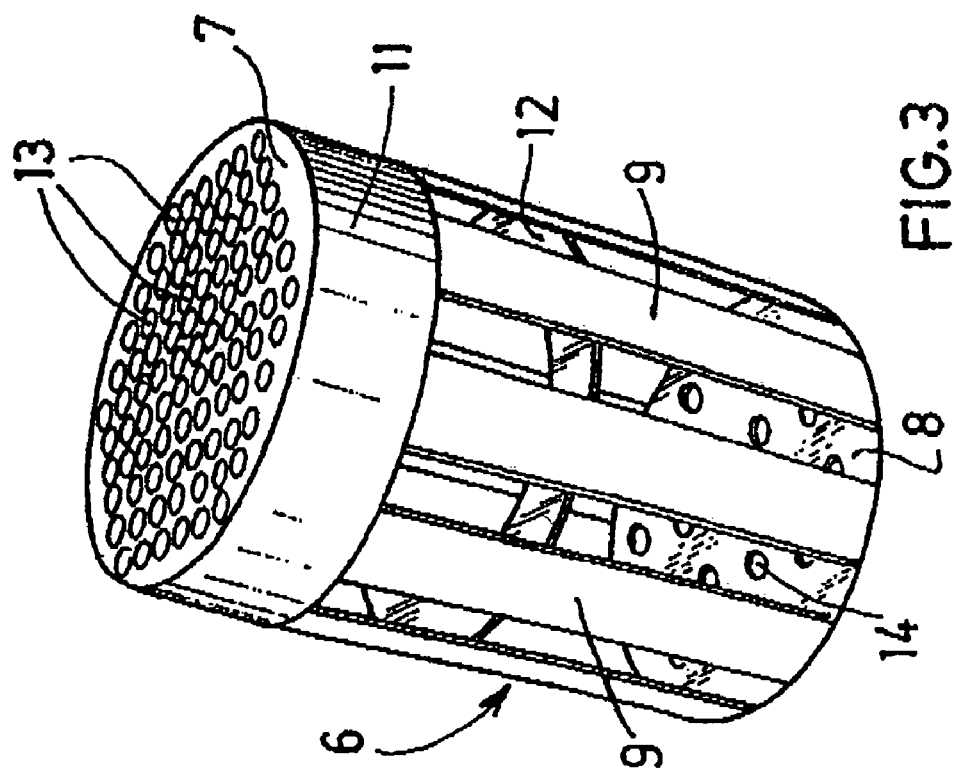

DEVICE FOR HOMOGENEOUS DISTRIBUTION OF A FLUID IN A CHAMBER AND USES THEREOF

CROSS-REFERENCE TO RELATED APPLICATION

This disclosure is based upon, and claims priority from, French patent application No. 01 05981 filed May 4, 2001, the contents of which are incorporated by reference herein.

FIELD OF THE INVENTION

The present invention concerns a device for the homogeneous distribution of a fluid within an enclosure. More particularly, the purpose of the invention is a device which maybe fitted in a fluid supply conduit, in order to distribute this fluid inside an enclosure in a substantially homogeneous fashion.

The invention also concerns uses for this device, in particular, in the supply of a chemical reactor with a fluid charge to be processed.

BACKGROUND OF THE INVENTION

Numerous types of enclosures exist which are supplied continuously with a fluid, which, depending on the applications, may be a liquid, a gas or a liquefied gas, used alone or in a mixture. Generally, it is desirable to distribute the fluid within the enclosure in a homogeneous fashion, that is, in the same manner for any transversal cross-section of the enclosure.

It may be the case, for instance, of a chemical reactor, supplied with a charge to be processed, or a heat exchanger, supplied with a liquid or gaseous primary fluid, wherein are submerged pipes carrying a secondary fluid.

These enclosures are often spherically shaped and are generally supplied at their base or at their top through a conduit, which often exhibits an elbow, in the immediate vicinity of its connection to the enclosure. Yet, it is known that the presence of such an elbow causes variations in the flow speed of the fluid, thus significantly disturbing its distribution within the enclosure. Where this enclosure is, for instance, a chemical reactor comprising a fixed catalyst bed, these disturbances may cause physical distortions at the top of the catalyst bed in terms of the arrangement of catalyst pellets, create waves on the surface of the bed, or encourage movements of catalyst fines, all of which hamper the ideal operation of the reactor.

It is therefore advantageous and even essential to distribute the fluid in the most homogeneous fashion possible at the top of the enclosure, particularly of a reactor, in order to minimize operating incidents caused by upsetting the surface of the catalyst bed and, consequently, to increase the duration of the operating cycle.

In order to meet these requirements, various types of homogenization and distribution systems have been proposed to date.

Thus, it has been suggested that a pre-distributor be placed inside the supply conduit, downstream of the elbow which it may comprise, and upstream of the opening by which it discharges into the enclosure being supplied, and, preferably, a second distributor downstream of this opening.

It was thus proposed that, for single-phase flows, a simple plate, located transversally within the supply conduit and pierced with holes distributed in a substantially regular fashion across its entire surface, be used as the pre-distributor.

Such a perforated plate considerably improves the homogeneity of the distribution of a fluid, for instance, water vapor having a relatively high flow speed (in excess of 5 m/s). In addition, it significantly diminishes the effects caused by the presence of an elbow on the supply conduit, upstream of the plate. The use of such a plate, in the case of a single-phase flow, therefore appears highly advantageous; however, its use is limited to this type of application.

It was also proposed that a static mixer be used at the output of the supply opening within the enclosure. Such mixers are essentially provided for laminar flows, especially flows of mixtures of highly viscous fluids, or mixtures or dispersions of liquids with highly different viscosities, in order to significantly improve the homogeneity of multiphase mixtures and reduce gas-liquid discontinuity in particular.

These static mixers, nevertheless, have the inconvenience of occupying a considerable height within the enclosure, often at the expense of catalyst mass.

Among the distribution systems often used downstream of the pre-distributors mentioned above, the following will be mentioned, particularly for the distribution of gas phases:

distributors comprising an element shaped as a perforated spherical cap, the concave side of which faces the pre-distributor, and the surface of which comprises orifices of variable size, distributed in a rather uniform fashion;

distributors comprising an element generally shaped as a truncated cone, located downstream of the pre-distributor, the end with the smaller cross-section facing the pre-distributor;

diffusers comprising at least two coaxial pipes inserted into the supply conduit from the enclosure being supplied, these pipes being connected to flared, e.g., truncated cone-shaped, sections within this enclosure.

All these distribution systems, as well as most of those available on the market, act on the stream of supply fluid by deflecting the direction of its flow and have considerable efficiency. They must, however, be adapted to each individual case, and their design depends—particularly and to a very large extent—on the flow rate of the fluid being distributed, which significantly increases their manufacturing cost.

Furthermore, all such assemblies consisting of a pre-distributor and distributor for the fluid cannot provide, at the same time:

a minimum speed of the fluid impacting the surface of the catalyst bed, on the order of, e.g., 1 m/s or below, when the flow rate of the charge varies from roughly one hundred tons per hour to several hundred tons per hour. Indeed, such low speeds minimize physical disturbances on the surface of the catalyst bed caused by the fluid impacting upon it more or less severely and also reduce the creation of catalyst fines caused by the charge recirculation phenomena in the space between the surface of the catalyst bed and the internal upper wall of the reactor;

a significant reduction in the residence time of the charge in the reactor minimizing the formation of gums on top of the catalyst bed. Indeed, it is known that the presence of such gums leads to charge losses within the reactor, which in turn reduces the unit's cycle time;

a significant increase in the flow rate of the charge without a degradation in the quality of its distribution within the reactor and particularly on any transversal surface thereof, more particularly, on the surface of the catalyst bed; and finally, an increased volume of the catalyst bed obtained by reducing the bulk occupied by the pre-distributor and distributor assembly.

BRIEF SUMMARY OF THE INVENTION

The goal of the present invention is to remedy these inconveniences by proposing a fluid distribution device which lacks two distinct separate elements—pre-distributor and distributor—but instead consists of a compact, single-unit, and autonomous assembly, adaptable to the requirements of a large number of reactors.

Another goal of the invention is to propose a distribution device of this type which may be used without modification for highly variable fluid flow rates.

Another goal of the invention is to propose such a device which provides a homogeneous distribution of fluid throughout the entire transversal surface of the enclosure being supplied.

Finally, another goal of the invention is to propose such a device which eliminates or considerably reduces the extent of fluid recirculation phenomena within the enclosure it supplies, as well as significantly reduces the residence time of the fluid in this enclosure.

To this end, the object of the invention is a device for the homogeneous distribution and dispersion of a fluid within an enclosure, this device essentially comprising a diffusion chamber designated to be located at least partially inside the enclosure, substantially on the axis of the conduit supplying fluid to this enclosure, and to be inserted into this conduit, preferably at the connection between the conduit and the enclosure, this diffusion chamber comprising on the totality of its lateral walls means of discharging the fluid into the section of the enclosure being filled, this device being characterized in that the diffusion chamber consists of a single-unit assembly comprising:

a first perforated plate designed to be located upstream in the direction of fluid flow and allowing the supply of fluid to said diffusion chamber, a second perforated plate located downstream and designed to evacuate part of the fluid towards the inside of the enclosure, these two plates having a shape and dimensions substantially identical to those of the transversal section of the conduit to be fitted, and being pierced with holes distributed in a substantially regular fashion across their surface, lateral bands, regularly spaced from one another, placed perpendicularly to the two perforated plates and joining them at their periphery, either directly or by means of a skirt.

at least one insert consisting of a ring-shaped crown of an outer diameter identical to the inner diameter of the chamber, this ring-shaped crown being placed perpendicularly to the axis of the supply conduit and projecting towards the inside of the chamber from the lateral wall or walls thereof, to which it is rigidly affixed, such as to form a lateral obstacle to the flow of the fluid, and in that the surface area of the insert is sufficient for creating, in the upstream section of the chamber, a pressure superior to that in the downstream section, such as to enforce the supply of fluid to the outermost region of the transversal section of the enclosure.

BRIEF DESCRIPTION OF THE DRAWINGS

The invention will be described in more detail in the application below, with reference to the schematic drawings attached. On these drawings:

FIG. 3 is a perspective view of the charge distribution device used in this reactor;

FIG. 4 is another, partial perspective view of the device in FIG. 3, showing the interior of this device.

DETAILED DESCRIPTION OF PREFERRED EMBODIMENTS

Figure 2:
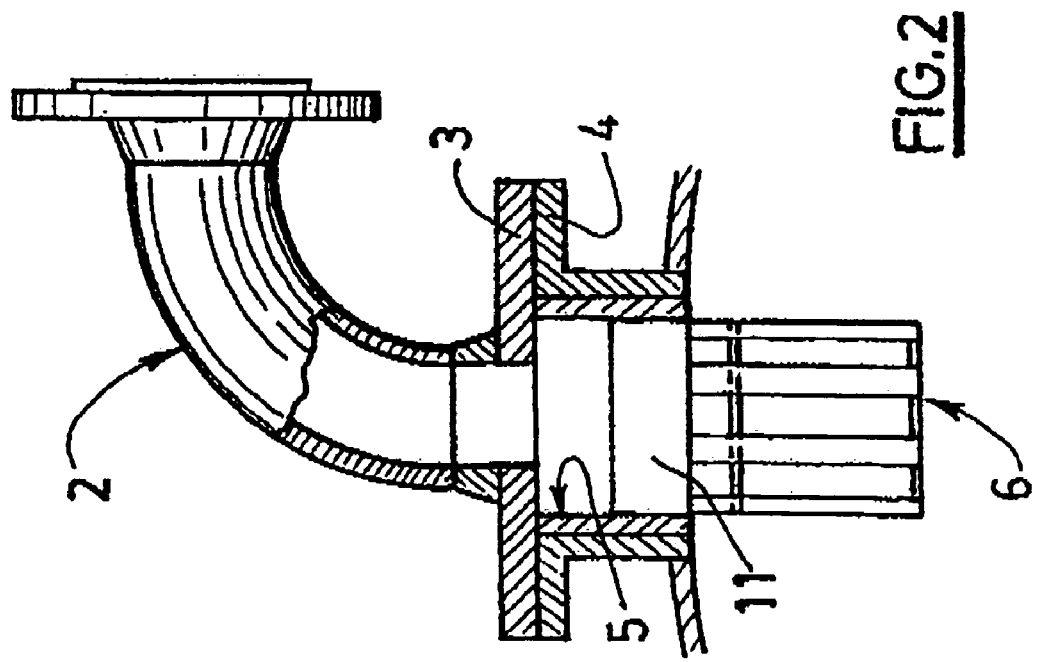
FIG. 2 is a larger-scale detail view showing the connection of the supply conduit to this reactor.

In the context of the present invention, the term "supply conduit" incorporates both the conduit itself and the tubular opening on the enclosure to which it is connected. Where, in the following description and in the attached claims, mention is made of a conduit fitted or to be fitted with the device according to the invention, the term "conduit" may have either of these meanings.

The device according to the invention therefore comprises a single-unit assembly composed of two perforated plates perpendicular to the axis of the supply conduit, having the cross-section substantially equal to the transversal internal cross-section of the conduit to be fitted, these two plates being pierced with holes arranged in a substantially regular fashion across their surface and being affixed at their periphery to lateral bands which are perpendicular thereto, these bands being regularly spaced from one another. The perforated plate located upstream serves as a pre-distributor of the fluid, whereas the other perforated plate, located downstream, constitutes a means of discharging the fluid towards the section of the enclosure to be filled.

The two perforated plates are, preferably, perforated at a different rate, the plate intended to be placed upstream in the conduit to be fitted having a larger number of perforations and a larger surface area pierced with holes than the plate located downstream, which serves as the distributor itself.

Perforations on the plate located upstream represent between 10% and 50% and, advantageously, around one-third of the surface area of this plate, whereas those on the plate located downstream occupy between 10% and 50% and, preferably, between 5% and 10% of the surface area of the latter.

The shape and dimensions of the perforations may be the same for the two plates, or different, depending on the desired effect.

These perforations may, for instance, be circular and have a diameter comprised between 1.25 cm and 5 cm.

The ring-shaped insert projects from the lateral bands to which it is affixed. It is shaped as a crown; however, this term must not be limited to its common geometrical meaning, seeing as the central opening of this crown may be offset from the axis of the diffusion chamber, and it may have a shape which is not necessarily circular. This crown projects towards the inside of the diffusion chamber, perpendicularly to the axis of the fluid supply conduit, and thus forms a lateral obstacle to the flow of fluid. The surface of the crown must be sufficient to create, in the upstream section of the device, a pressure superior to that in the downstream section, such as to enforce the supply of fluid to the outermost region of the transversal section of the enclosure, which is, in general, cylindrically shaped.

This ring-shaped insert may be located at various points in the chamber such as to accommodate for the geometrical configuration of the enclosure, in particular, between 25% and 75% of the distance separating the first plate of the diffusion chamber from the second plate and, preferably, between 50% and 60% of this distance. The surface area of the insert represents between 20% and 80% and, preferably, between 40% and 60% of the transversal section of the diffusion chamber.

The fraction of fluid which encounters the ring-shaped insert is diverted by the latter, in part being ejected towards the outside, through the spacing separating the lateral bands of the diffusion chamber, and in part being directed towards the inside of the device. The presence of this insert thus considerably increases the efficiency of the device in terms of homogenization of the fluid flow distributed within the enclosure. In addition, it offers the advantage of being highly insensitive to variations in the flow rate.

The full surface area of the insert represents between 20% and 80% of the transversal section of the diffusion chamber and, preferably, between 40% and 60% of this section.

The intervals separating the lateral bands of the device represent between 30% and 70% and, advantageously, between 40% and 60% of the external lateral surface area of the device.

Preferably, the bands are connected to one another by means of a skirt, itself affixed to the perforated plate intended to be placed upstream in the conduit to be fitted, such as to allow for the homogenization of the flow downstream of the pre-distributor. This skirt extends, preferably, over a length representing between 10% and 30% of the height of the diffusion chamber.

The distributor according to the invention may have a transversal cross-section of any shape, in particular, circular or square, adapted to the internal cross-section of the pipe it is designed to be fitted in.

In a preferred embodiment of the invention, the device is placed at least partially within the supply conduit to the enclosure, at the connection between said conduit and the enclosure.

The device is designed to be inserted into the pipe to be fitted such as to project outside the latter towards the inside of the enclosure, on a distance representing between 60% and 80% of its length.

This device is suitable for various uses, for the supply of various enclosures with single-phase and multiphase fluids, with flow rates varying between very large limits. Computing means known in the art can be used to establish the size of the device, and particularly that of the insert, such as to suit the reactor being fitted.

Furthermore, the shape of the insert, its dimensions, and its location within the diffusion chamber can be perfectly modeled and calculated using computing means known in the art.

The device appears particularly advantageous in supplying a charge to be processed, especially a charge of hydrocarbons, to a reactor comprising a fixed catalyst bed.

This use of the device, which will be described in greater detail below, constitutes another object of the present invention.

Figure 1:
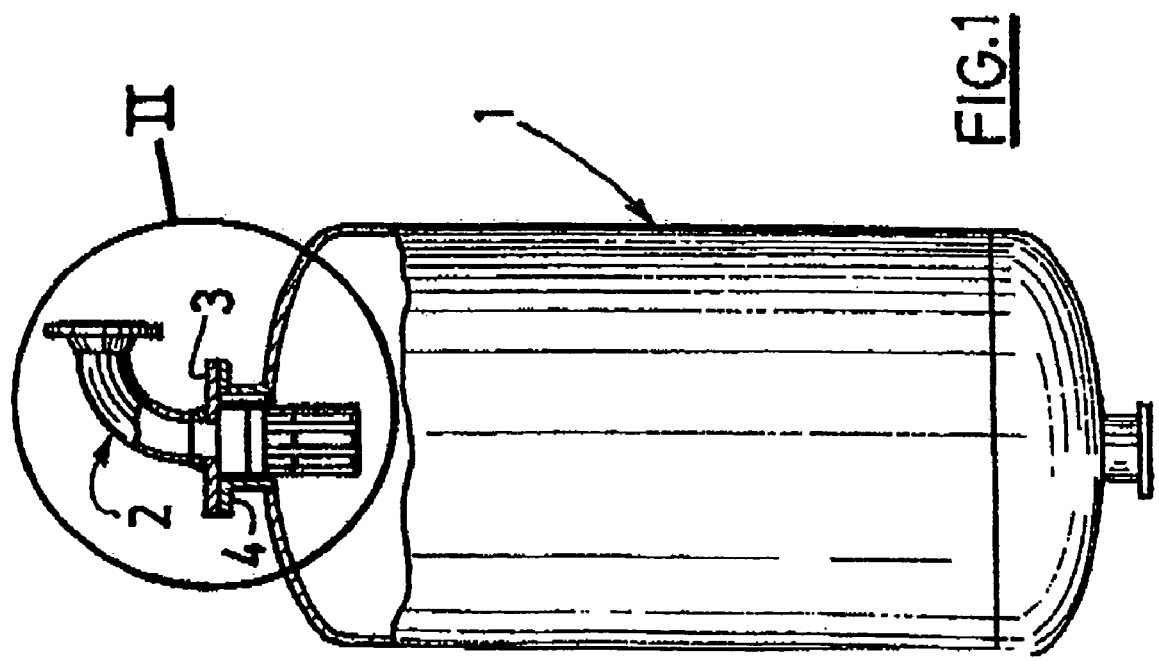
FIG. 1 is an elevation view, with a partial cut-out, of a hydrocarbon hydrotreating reactor, with a fixed catalyst bed.

The reactor 1 shown in FIG. 1 is a gasoline hydrotreating reactor, wherein a fixed catalyst bed is laid. Reactors of this type are well-known in the art; reactor 1 will therefore not be described in more detail.

Reactor 1 is supplied with gas-phase gasoline at its upper side via a conduit, not shown, connected to the reactor 1 by an elbow 2.

As can be seen on FIG. 2, the elbow 2 comprises a flange 3, affixed to a flange 4 located at the entrance of a tubular opening 5 on the reactor.

It is this tubular opening which is intended to receive the distribution device 6 according to the invention, which is itself affixed to the tubular opening by any means known in the art.

As shown on FIGS. 3 and 4, this device 6 is comprised of:
a first perforated metal plate 7, located at the upstream end of the device in the direction of the flow of gasoline vapors and which serves as a pre-distributor,
a second perforated metal plate 8, parallel to the previous one and located at the downstream end of the device, which serves as the distributor itself;
metal bands 9, here numbering ten and having a length of 45 cm and a width of 8.08 cm, which connect the edges of plates 7 and 8, to which they are perpendicular, these bands 9 being regularly spaced from one another and separated by intervals 10, having a width of 5.38 cm;
a metal skirt 11 adjacent to the periphery of plate 7 and connecting the bands 9 to one another,
a metal ring insert 12, shaped as a flat crown, affixed to the bands 9 and projecting from the internal face of these bands towards the inside of the device, parallel to the plates 7 and 8.

As indicated above, the perforations 13 on the upstream plate 7 are more numerous than the perforations 14 on the plate 8 and occupy a more significant fraction (here, about 32% of this plate 7) than the portion of the plate 8 occupied by the perforations 14 thereof (here, about 7%).

The shapes and dimensions of perforations 13 and 14, as well as the manner of their distribution across the surface of plates 7 and 8, may be absolutely arbitrary and are chosen in accordance with the desired effect; however, it is preferable that the perforations on a given plate be arranged along parallel intersecting lines, rather than along concentric circles.

The device 6 is placed in the tubular opening 5 of the reactor 1 and therefore has an outer transversal section of the same shape (circular here) and dimensions (here, a diameter of 42.86 cm) as the inner transversal section of the opening 5. The skirt 111 is applied against the internal surface of this opening, which has the purpose of homogenizing the flow.

The intervals 10 separating the bands 9 (here, numbering ten) occupy roughly 40% of the surface comprised between the bottom of the skirt 11 and the plate 8.

The bands 9 may be replaced with simple bars, provided that the general configuration of the device, shaped as a "bird cage", is preserved.

As described above, the crown-shaped insert 12 plays an essential role in the device, seeing as it constitutes an obstacle to the free passage of the flow, already pre-homogenized after passing through the perforations 13 of the plate 7, with the effect of diverting the fraction of this flow which encounters the insert, either towards the outside of the device, through the intervals 10 separating the bands 9, or towards the inside of the device.

In the implementation shown in the drawings, the surface of the insert represents around 50% of the transversal section of the device, and it is located at a distance from the plate 8 representing 60% of the length of the bands 9.

In this application, the fluid consists of gasoline vapors; however, the device according to the invention can be applied equally well for a substantially homogeneous distribution of liquids or liquefied gases, even more so seeing as, in the present use, gasoline vapors are considered as being an incompressible gas.

The following example illustrates the advantages of a device according to the invention in this application.

EXAMPLE

In this example, the gasoline hydrotreating reactor is a cylindrical reactor, having the following dimensions:
internal diameter=3 m,
height of reactor=11 m.
It contains a fixed catalyst bed with the following main geometrical characteristics:
height=3.75 m
distance from the surface of the catalyst bed to the distribution device=0.6 m.
The hydrogen used for hydrotreating is fed downstream of the reactor.
Gasoline vapors are fed into the reactor under the following conditions:

| | | |
|---|---|---|
| feed rate (t/h): | *standard: | 131.4, |
| | *maximum: | 178.0, |
| | *debottlenecking: | 200.0, |
| operating pressure ($10^5$ Pa): | | 29.8, |
| vapor density (kg/m$^3$): | | 43.93, |
| vapor viscosity (mm$^2$/s): | | 0.01641. |

In the tests conducted for each flow rate indicated, the following were used as the means of distribution:
a simple perforated plate identical to the plate 7 of the device described above, placed at the output of the tubular opening 5;
the implementation as described above of the device according to the invention, however without the crown-shaped insert 12;
the same device, with the insert 12.
In the case of the device according to the invention, with or without the insert, it is inserted into the tubular opening 5 on a length representing 40% of the height of the device, and therefore, projects outside this opening towards the inside of the reactor.
The maximum speed of the vapor flow at the surface of the bed was measured for each device, and the results obtained were summarized in Table I below.

TABLE 1

Maximum speed of vapors impacting the surface of the catalyst bed

| Device | Flow rate | | |
|---|---|---|---|
| | 131.4 t/h | 178 t/h | 200 t/h |
| Perforated plate alone | 3.0 m/s | — | — |
| Device without insert | 1.5 m/s | 2.3 m/s | 4.2 m/s |
| Device with insert | 0.4 m/s | — | 1 m/s |

This table shows that the device according to the invention can considerably limit disturbances caused by the gasoline vapors impacting the surface of the catalyst bed, seeing as the impact speeds are limited to a very significant extent, particularly where the device comprises an insert, not solely for a standard feed rate, but also for considerably higher rates.

In addition, this can substantially reduce the extent of recirculation at the head of the reactor. This is explained by the fact that the fluid flows in layers, the flow being "split" at a number of locations:
by the upstream plate 7, serving as a pre-distributor,
at the ring-shaped insert 12, where the flow is separated in two;
by the downstream plate 8, where the flow is again homogenized.
The following advantages, highly appreciable for the present application, arise:
reduced movement of catalyst fines, coupled with a decrease in the formation of gums;
the height of the catalyst bed can be increased; this increase may amount to as much as 10% of the catalyst volume, resulting in an improved cycle time, due, in particular, to an increased catalyst mass;
the flow rate of the charge being processed can be increased without degrading the quality of distribution of this charge;
a shorter residence time of the charge in the reactor.
The advantages of the distribution device according to the invention are therefore clearly evidenced by these tests.
In addition to its use in hydrotreating reactors in the petrochemical 5 industry, the device according to the invention can be employed in various other types of enclosures and, in particular, the shell of a heat exchanger.

The invention claimed is:

1. A device for the homogeneous distribution and dispersion of a fluid within an enclosure, comprising a diffusion chamber designated to be located at least partially inside the enclosure, substantially on the axis of a conduit supplying fluid to the enclosure, and to be inserted into the conduit, wherein the diffusion chamber comprises on the totality of its lateral walls means of discharging the fluid into a section of the enclosure being filled, and wherein the diffusion chamber comprises a single-unit assembly comprising:
a first perforated plate, designed to be located upstream in the direction of fluid flow and allowing the supply of fluid to the diffusion chamber;
a second perforated plate located downstream and designed to evacuate part of the fluid towards the inside of the enclosure, the first and second perforated plates having a shape and dimensions substantially identical to those of a transversal section of the conduit to be fitted, and being pierced with holes distributed in a substantially regular fashion across their surface;
lateral bands, regularly spaced from one another, placed perpendicularly to the first and second perforated plates and joining them at their periphery, either directly or by means of a skirt; and
at least one insert comprising a ring-shaped crown of an outer diameter identical to the inner diameter of the diffusion chamber, the ring-shaped crown being placed perpendicularly to the axis of the supply conduit and projecting towards the inside of the diffusion chamber from the lateral wall or walls thereof, to which it is rigidly affixed, such as to form a lateral obstacle to the flow of the fluid,
wherein the surface area of the at least one insert is sufficient for creating, in an upstream section of the diffusion chamber, a pressure superior to that in a downstream section, such as to enforce the supply of fluid to the outermost region of a transversal section of the enclosure.

2. The device according to claim 1, wherein the at least one insert is located in the diffusion chamber at a distance from the first perforated plate comprised between 25% and 75% of the distance separating the first perforated plate from the second perforated plate.

3. The device according to claim 1, wherein the full surface area of the at least one insert represents between 20% and 80% of a transversal section of the diffusion chamber.

4. The device according to claim 1, wherein the fraction of the surface occupied by the perforations on the first perforated plate is greater than the fraction of the surface occupied by the perforations on the second perforated plate.

5. The device according to claim 1, wherein the perforations on the first perforated plate occupy between 10% and 50% of the surface area of the first perforated plate.

6. The device according to claim 1, wherein the perforations on the second perforated plate occupy between 5% and 25% of the surface area of the second perforated plate.

7. The device according to claim 1, wherein intervals between the lateral bands represent between 30% and 70% of an external lateral surface area of the diffusion chamber.

8. The device according to claim 1, wherein the skirt extends from the first perforated plate over a length representing between 10% and 30% of the distance separating the first perforated plate from the second perforated plate.

9. A method of homogeneously distributing a fluid within an enclosure, comprising inserting the device of claim 1 into a supply pipe of the enclosure or into a ring-shaped opening of the enclosure to which the supply pipe is connected, wherein the diffusion chamber of the device has an external transversal section substantially equal to an internal transversal section of the supply pipe to the enclosure or of the ring-shaped opening of the enclosure to which the supply pipe is connected, and wherein the device is inserted into the supply pipe of the enclosure or into the ring-shaped opening to a distance representing between 5% and 50% of its length.

10. The method of homogeneously distributing a fluid within an enclosure according to claim 9, wherein the enclosure is a chemical reactor designated for the processing of a charge which constitutes the fluid to be distributed within the enclosure.

11. The method of homogeneously distributing a fluid within an enclosure according to claim 10, wherein the reactor is a reactor comprising a fixed catalyst bed.

12. The device according to claim 1, wherein the diffusion chamber is inserted into the conduit at the connection between the conduit and the enclosure.

13. The device according to claim 2, wherein the at least one insert is located in the diffusion chamber at a distance from the first perforated plate comprised between 50% and 60% of the distance separating the first perforated plate from the second perforated plate.

14. The device according to claim 3, wherein the full surface area of the at least one insert represents between 40% and 60% of the transversal section of the diffusion chamber.

15. The device according to claim 5, wherein the perforations on the first perforated plate occupy one-third of the surface area of the first perforated plate.

16. The device according to claim 6, wherein the perforations on the second perforated plate occupy between 5% and 10% of the surface area of the second perforated plate.

17. The device according to claim 7, wherein intervals between the lateral bands represent between 40% and 60% of the external lateral surface area of the diffusion chamber.

18. The method of homogeneously distributing a fluid within an enclosure according to claim 9, wherein the device is inserted into the supply pipe of the enclosure or into the ring-shaped opening to a distance representing between 20% and 40% of its length.

19. The method of homogeneously distributing a fluid within an enclosure according to claim 10, wherein the charge comprises a hydrocarbon charge.

* * * * *